(12) United States Patent
Nakamura et al.

(10) Patent No.: US 9,347,547 B2
(45) Date of Patent: May 24, 2016

(54) TRANSMISSION

(71) Applicant: AISIN SEIKI KABUSHIKI KAISHA, Kariya-shi, Aichi-ken (JP)

(72) Inventors: Hideki Nakamura, Nagoya (JP); Kiyoharu Takagi, Okazaki (JP); Atsuhiro Mase, Aichi-ken (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 14/658,919

(22) Filed: Mar. 16, 2015

(65) Prior Publication Data

US 2015/0267805 A1 Sep. 24, 2015

(30) Foreign Application Priority Data

Mar. 24, 2014 (JP) .................................. 2014-059418

(51) Int. Cl.
*F16H 57/10* (2006.01)
*B60K 17/28* (2006.01)
*F16H 57/04* (2010.01)
*F16H 3/66* (2006.01)

(52) U.S. Cl.
CPC ................ *F16H 57/10* (2013.01); *B60K 17/28* (2013.01); *F16H 57/0479* (2013.01); *F16H 3/66* (2013.01); *F16H 3/666* (2013.01); *F16H 2200/0069* (2013.01); *F16H 2200/201* (2013.01); *F16H 2200/2046* (2013.01)

(58) Field of Classification Search
CPC ..... F16H 57/10; F16H 57/0479; F16H 3/666; F16H 2200/2046; F16H 3/66; F16H 2200/201; F16H 2200/0069; B60K 17/28
See application file for complete search history.

(56) References Cited

U.S. PATENT DOCUMENTS

| 5,522,778 | A | 6/1996 | Iwase et al. | |
| 6,938,512 | B2 | 9/2005 | Tanikawa | |
| 7,128,686 | B2 * | 10/2006 | Hitch | B60K 17/28 477/53 |
| 7,131,929 | B2 * | 11/2006 | Komer | F16H 57/033 475/331 |

(Continued)

FOREIGN PATENT DOCUMENTS

| JP | 2-129443 A | 5/1990 |
| JP | 2-129457 A | 5/1990 |

(Continued)

OTHER PUBLICATIONS

European Search Report issued Aug. 17, 2015, by the European Patent Office, in corresponding European Patent Application No. 15159332.4. (4 pages).

*Primary Examiner* — Drew Brown
(74) *Attorney, Agent, or Firm* — Buchanan Ingersoll & Rooney PC (57) ABSTRACT

A transmission which includes a housing, a planetary gear mechanism, an input shaft, an output shaft, a brake including a friction member, a piston member pressing the friction member, and an actuator portion applying a pressing force to the piston member, the brake braking a rotation of one of a sun gear, a ring gear, and a carrier of the planetary gear mechanism, an external output gear positioned between the friction member and the actuator portion in a direction of a rotation axis, the external output gear provided at a member integrally rotating with the input shaft, and the piston member including an opening portion formed over a predetermined angular range about the rotation axis and within a range in the direction of the rotation axis in which the external output gear is disposed.

7 Claims, 4 Drawing Sheets

(56) References Cited

U.S. PATENT DOCUMENTS

| | | | |
|---|---|---|---|
| 7,600,595 B2 * | 10/2009 | Harris | B60K 6/32 180/65.28 |
| 7,765,884 B2 | 8/2010 | Frait et al. | |
| 7,921,945 B2 * | 4/2011 | Harris | B60K 6/48 180/65.1 |
| 7,921,950 B2 * | 4/2011 | Harris | B60K 6/48 180/65.6 |
| 2004/0138022 A1 | 7/2004 | Tanikawa | |
| 2009/0114045 A1 * | 5/2009 | Wilson | F16H 55/18 74/11 |

FOREIGN PATENT DOCUMENTS

| | | |
|---|---|---|
| JP | 2004-204888 A | 7/2004 |
| JP | 2009-083838 A | 4/2009 |

* cited by examiner

TRANSMISSION

CROSS REFERENCE TO RELATED APPLICATIONS

This application is based on and claims priority under 35 U.S.C. §119 to Japanese Patent Application 2014-059418, filed on Mar. 24, 2014, the entire content of which is incorporated herein by reference.

TECHNICAL FIELD

This disclosure generally relates to a transmission.

BACKGROUND DISCUSSION

A transmission is applied as an apparatus for changing speed of a rotation drive force that a power source, for example, an engine mounted to a vehicle, outputs. A known transmission for a vehicle disclosed in JP 2004-204888A (hereinafter referred to as Patent reference 1) includes plural planetary gear mechanisms and plural engaging elements. According to a layout disclosed in Patent reference 1, by the actuations of clutches and brakes serving as engaging elements, speed stages having six forward speeds and one reverse speed can be established.

Some transmissions include a Power Take-Off (PTO) mechanism that outputs a rotation drive force inputted to the transmission as an auxiliary power to the outside, or an external device. For example, according to Patent reference 1, a Power Take-Off (PTO) mechanism that outputs, or takes out the rotation drive force from an external output gear (PTO gear) that is disposed at an outer periphery side of a clutch drum integrally rotating with an input shaft. Further, JP2009-83838A (hereinafter referred to as Patent reference 2) discloses a Power Take-Off (PTO) mechanism that outputs a rotation drive force via an intermediate gear from a power take-off gear (PTO gear) disposed at an outer periphery side of a shaft member that integrally rotates with an impeller shaft of a torque converter.

In case of outputting the rotation drive force having the same rotation number with an input shaft to the outside by a PTO mechanism provided at the transmission, constructions disclosed in Patent references 1 and 2 may be applied. According to the construction in which the PTO mechanism is provided, a brake may be disposed near the PTO gear. In those circumstances, components of the brake need to be disposed so as not to impede the output of the rotation drive force by the PTO gear in the transmission, thus layout designs may be limited.

A need thus exists for a transmission which is not susceptible to the drawback mentioned above.

SUMMARY

In light of the foregoing, the disclosure provides a transmission, which includes a housing, a planetary gear mechanism supported by the housing to be rotatable about a rotation axis, an input shaft supported by the housing to be rotatable about the rotation axis, the input shaft being inputted with a rotation drive force, an output shaft supported by the housing to be rotatable about the rotation axis, the output shaft outputting the rotation drive force with speed changed by the planetary gear mechanism, a brake including a friction member, a piston member pressing the friction member, and an actuator portion applying a pressing force to the piston member, the brake braking a rotation of one of a sun gear, a ring gear, and a carrier of the planetary gear mechanism, an external output gear positioned between the friction member and the actuator portion in a direction of the rotation axis, the external output gear provided at a member integrally rotating with the input shaft, the external output gear for outputting the rotation drive force to an outer periphery side relative to the housing, and the piston member including an opening portion formed over a predetermined angular range about the rotation axis and within a range in the direction of the rotation axis in which the external output gear is disposed.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Embodiments of a transmission will be explained with reference to illustrations of drawing figures as follows. According to the embodiment, the transmission is applied to change speed of rotation drive force that a power source, for example, an engine mounted to a vehicle, outputs. The vehicle is configured to move forward or backward at a predetermined speed stage that the transmission establishes, the vehicle is moved by the transmitting of the rotation drive force, to driving wheels of the vehicle via a differential device, for example, where the speed of the rotation drive force is change by the transmission.

An entire configuration of an automatic transmission 1 will be explained with reference to FIG. 1. The automatic transmission 1 includes a torque converter 10, an oil pump 20, and a transmission 30. The automatic transmission 1 inputs a rotation drive force of a vehicle engine to an input shaft N via the torque converter 10. The automatic transmission 1 changes the speed of the rotation drive force inputted from the input shaft N by the transmission 30 and outputs the same with the changed speed from an output shaft T. The input shaft N and the output shaft T are shaft members that are supported by a housing H to be rotatable about a rotation axis L.

A construction of the torque converter 10 will be explained as follows. The torque converter 10 corresponds to a fluid clutch that amplifies the rotation drive force by a circulation of the operation oil. As illustrated in FIG. 1, the torque converter 10 includes a stator 11, a pump impeller 12, a turbine runner 13, and a lock-up clutch 14. The stator 11 is connected to the housing H via a one-way clutch.

The pump impeller 12 is connected to a crankshaft S and is integrally rotated with the crankshaft S. The turbine runner 13 is positioned facing the pump impeller 12. The rotation drive force is transmitted from the pump impeller 12 to the turbine runner 13 via the operation oil. The turbine runner 13 is connected to the input shaft N and outputs the amplified rotation drive force to the input shaft N.

The lock-up clutch 14 is disposed between the crankshaft S and the turbine runner 13. The lock-up clutch 14 is an engaging device operated by the oil pressure, which selectively connects the crankshaft S and the input shaft N. Upon the actuation of the lock-up clutch 14, an oil pressure piston pushes plural clutch plates to transmit the drive force. Thus, when the lock-up clutch 14 is engaged, the crankshaft S and the input shaft N integrally rotate.

A construction of the oil pump 20 will be explained as follows. The oil pump 20 generates the oil pressure to actuate the lock-up clutch 14 and to actuate engaging elements that are operated by the oil pressure and provided at the transmission 30. A rotor 21 of the oil pump 20 is connected to the pump impeller 12 of the torque converter 10 and integrally rotates with the pump impeller 12. The oil pump 20 is actuated by the rotation of the pump impeller 12 to generate the oil pressure.

A pump body 22 of the oil pump 20 is fixed to the housing H by bolts. The pump body 22 rotatably supports the rotor 21. The pump body 22 includes an oil passage to distribute the oil pressure generated at the oil pump 20 and an oil passage to suck the circulating operation oil. Further, the oil pump body 22 forms an oil pressure chamber Mh formed between the oil pump body 22 and a first brake B1.

A construction of the transmission 30 will be explained as follows. The transmission 30 includes three planetary gear mechanisms P1-P3 that are supported by the housing H to be rotatable about the rotation axis L, four clutches C1-C4 selectively connecting plural elements, and two brakes B1, B2 that brake rotations of predetermined elements. Further, a vehicle control ECU 2 controls an operation state of the engaging elements including the clutches C1-C4 and the brakes B1, B2 on the basis of the control signal.

According to the embodiment, each of the planetary gear mechanisms P1-P3 includes a sun gear, a ring gear, and a carrier, that are defined as three elements. The first planetary gear mechanism P1, the second planetary gear mechanism P2, and the third planetary gear mechanism P3 are arranged in the described order from an input side where the input shaft N is positioned (i.e., left-hand side in FIG. 1) to an output side where the output shaft T is positioned (i.e., right-hand side in FIG. 1) in a direction of the rotational axis L. In other words, the first planetary gear mechanism P1, the second planetary gear mechanism P2, and the third planetary gear mechanism P3 are arranged in the described order from an input side which is positioned closer to the input shaft N (i.e., left-hand side in FIG. 1) to an output side which is positioned closer to the output shaft T (i.e., right-hand side in FIG. 1) in the direction of the rotational axis L.

The clutches C1-C4 are engaging elements allowing to selectively connect the plural elements. According to the embodiment, the clutches C1-C4 are normal open type clutches, which are actuated by the oil pressure supplied from the oil pump 20. The control ECU 2 actuates the oil pump 20 on the basis of a control command. Thus, the oil pressure is supplied to the oil pressure chamber of the clutches C1-C4 via an oil passage formed, for example, at the pump body 22 and an oil passage formed within the input shaft N.

The brakes B1, B2 are engaging elements that are provided at the housing H and that brake the rotation of the predetermined elements. According to the embodiment, the brakes B1, B2 are oil pressure type brakes that are actuated by the supplied oil pressure similarly to the clutches C1-C4. The control ECU 2 actuates the oil pump 20 on the basis of the control command. Thus, the oil pressure is supplied to the oil pressure chamber of the brakes B1, B2 via the oil passages formed at the pump body 22 and the housing H. In those circumstances, the first brake B1 and the second brake B2 are arranged in the described order from the input side to the output side of the transmission 30 in the direction of the rotation axis L.

More particularly, the first brake B1 includes plural friction members 81, a piston member 82, and an actuator portion 83. The plural friction members 81 include a type of the friction member of which relative rotation is restricted by the housing H and a type of the friction member of which relative rotation is restricted by the elements that is a target of the braking, and two types of the friction member are arranged alternately in the direction of the rotation axis L. The friction member 81 corresponds to a brake disc retained to be movable in the direction of the rotation axis L. The piston member 82 is configured to push the friction members 81 to make the friction members 81 contact one another. Details of structure of the piston member 82 will be explained hereinafter.

According to the embodiment, the actuator portion 83 of the first brake B1 positioned at the input side of the transmission 30 forms the oil pressure chamber Mh between the actuator portion 83 and the pump body 22 of the oil pump 20. A projection portion 22a is formed at an end surface of the pump body 22. The projection portion 22a protrudes from the end surface of the pump body 22 in the direction of the rotation axis L. The projection portion 22a is formed in an arc shape over a predetermined angular range about the rotation axis L at the end surface of the pump body 22. An outlet port of the oil is provided at an end of the projection portion 22a.

Further, the actuator portion 83 includes a recessed portion 83a formed to cover the projection portion 22a. The recessed portion 83a is ensured with sealing performance relative to a side surface of the projection portion 22a (the recessed portion 83a is sealed by means of a side surface of the projection portion 22a), and the recessed portion 83a is structured to be movable in the direction of the rotation axis L. Further, a circumferential end portion of the recessed portion 83a is engaged with the projection portion 22a in a circumferential direction to be stopped from rotating. Thus, the actuator portion 83 restricts the rotation of the piston member 82 connected to the actuator portion 83 by the engagement, about the rotation axis L, of the circumferential end portion of each portion (projection portion 22a, recessed portion 83a) that structures the oil pressure chamber Mh.

The oil pressure generated at the oil pump 20 is supplied to the oil pressure chamber Mh formed at the actuator portion 83 of the first brake B1 via a control valve, the oil pressure chamber Mh formed between the actuator portion 83 and the pump body 22. The actuator portion 83 applies the pressing force (thrust force) to the piston member 82 against the elastic force of the spring member upon the supply of the oil pressure to the oil pressure chamber Mh.

When the pressing force (thrust force) is applied to the piston member 82 upon the supply of the oil pressure to the actuator portion 83, the plural friction members 81 come to contact one another. Thus, the first brake B1 brakes the rotation of a predetermined target element. Further, the first brake B1 allows the rotation of the element that is a target of the braking by disengaging the plural friction members 81 when the supply of the oil pressure is stopped. The second brake B2 has a construction different from the first brake B1 in that an oil pressure chamber is formed between an actuator portion and the housing H. Other than that, basic constructions of the second brake B2 are substantially the same to the first brake B1, thus, the explanations are not repeated.

Layouts of the members of the transmission 30 will be explained as follows. For the purpose of indicating three elements of the planetary gear mechanism, "s" is added to P1, P2, P3 representing each of the planetary gear mechanisms for a sun gear, "r" is added to P1, P2, P3 representing each of the planetary gear mechanisms for a rung gear, and "c" is added to P1, P2, P3 representing each of the planetary gear mechanisms for a carrier. That is, for the first planetary gear mechanism P1, three elements are described as a sun gear P1$s$, a ring gear P1$r$, and a carrier P1$c$. The same rule is applied to the second planetary gear mechanism P2 and the third planetary gear mechanism P3 to express three elements.

Figure 1:
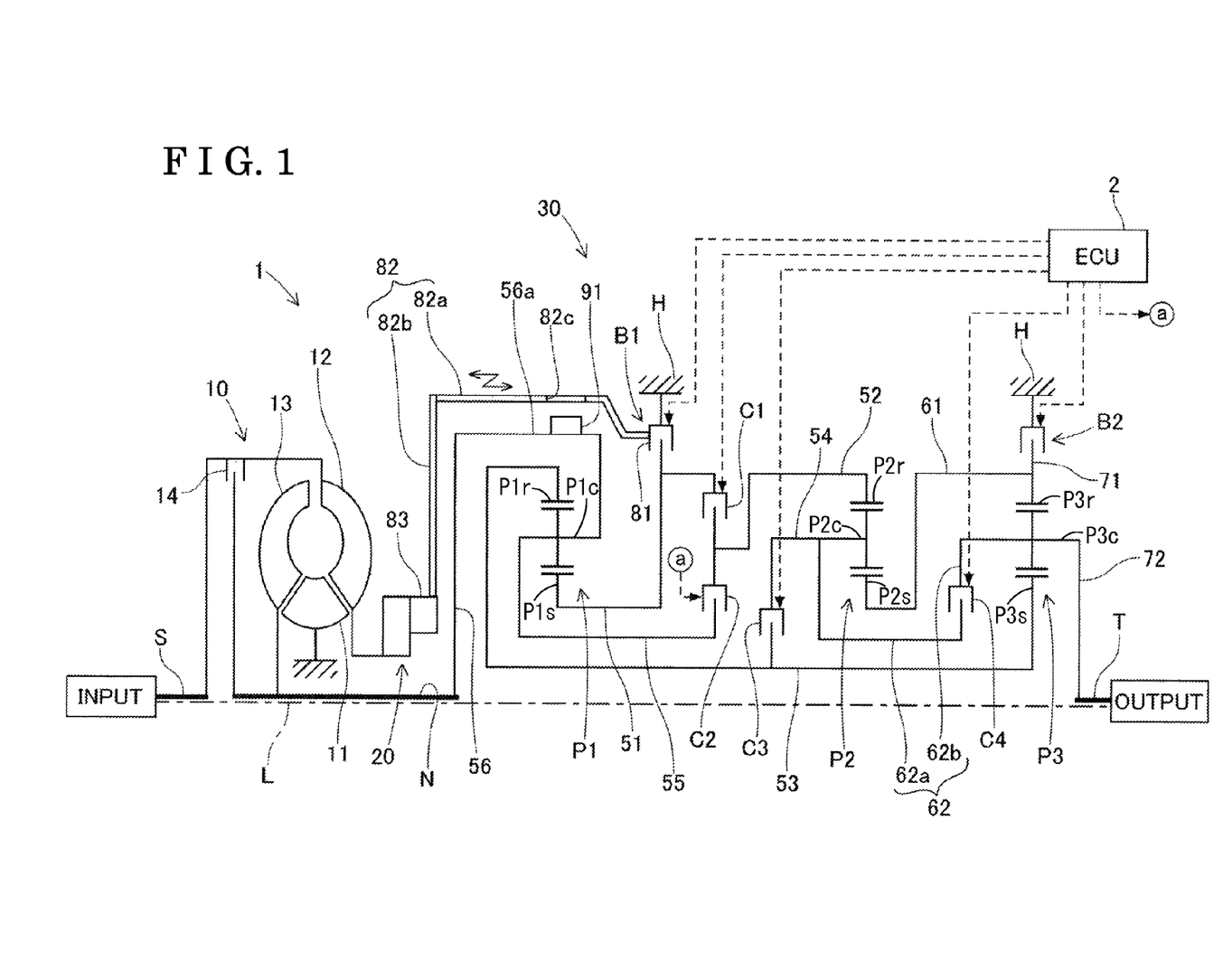
FIG. 1 is a schematic view showing an entire configuration of a transmission according to an embodiment disclosed here.

According to the embodiment, in each of the planetary gear mechanisms P1 to P3, each of the elements are connected, as illustrated in FIG. 1, relative to the input shaft N, the output shaft T, the clutches C1 to C4, the first brake B1, and the second brake B2. More particularly, the sun gear P1$s$ of the first planetary gear mechanism P1 is connected to the first brake B1 by means of a P1$s$B1 member 51 serving as a connection member. Further, the sun gear P1$s$ of the first planetary gear mechanism P1 is connected to the ring gear P2$r$ of the second planetary gear mechanism P2 by means of a P1$s$P2$r$ member 52 serving as a connection member that is connected to the P1$s$B1 member 51 via the first clutch C1.

The ring gear P1$r$ of the first planetary gear mechanism P1 is always connected to the sun gear P3$s$ of the third planetary gear mechanism P3 by means of a P1$r$P3$s$ member 53 serving as a connection member. Further, the ring gear P1$r$ of the first planetary gear mechanism P1 is connected to the carrier P2$c$ of the second planetary gear mechanism P2 by means of a P1$r$P2$c$ member 54 serving as a connection member connected to the P1$r$P3$s$ member 53 via the second clutch C2.

The carrier P1$c$ of the first planetary gear mechanism P1 is connected to the ring gear P2$r$ of the second planetary gear mechanism P2 by means of a P1$c$P2$r$ member 55 serving as a connection member connected to the P1$s$P2$r$ member 52 via the third clutch C3. Further, the carrier P1$c$ of the first planetary gear mechanism P1 is always connected to the input shaft N by means of a P1$c$N member 56 serving as a connection member. The P1$c$N member 56 integrally rotates with the input shaft N.

Figure 2:
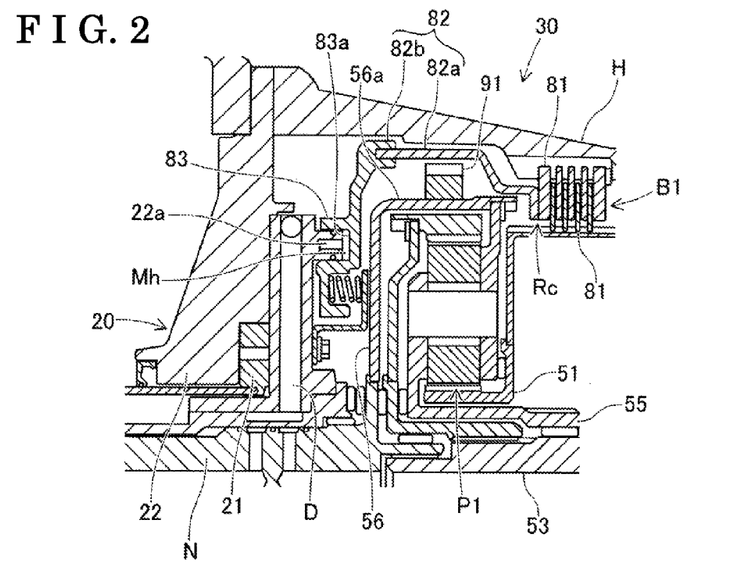
FIG. 2 is a cross-sectional view showing a part of the transmission disclosed in FIG. 1.

As illustrated in FIG. 2, the P1$c$N member 56 includes a cylindrical portion 56$a$ disposed at an outer periphery side of the ring gear P1$r$ of the first planetary gear mechanism P1. The cylindrical portion 56$a$ includes a cylindrical shape having a bottom that extends in the direction of the rotation axis L. A bottom portion of the cylindrical portion 56$a$ is connected to an outer periphery of the input shaft N. Thus, the cylindrical portion 56$a$ integrally rotates with the input shaft N. According to the embodiment, the P1$c$N member 56 always connects the input shaft N and the carrier P1$c$ of the first planetary gear mechanism P1.

The sun gear P2$s$ of the second planetary gear mechanism P2 is always connected to the ring gear P3$r$ of the third planetary gear mechanism P3 by means of a P2$s$P3$r$ member 61 serving as a connection member. The carrier P2$c$ of the second planetary gear mechanism P2 is connected to the carrier P3$c$ of the third planetary gear mechanism P3 by means of a P2$c$P3$c$ member 62 serving as a connection member. The fourth clutch C4 is provided at a P2$c$P3$c$ member 62.

The P2$c$P3$c$ member 62 includes a first connection part 62$a$ and a second connection part 62$b$. An end of the first connection part 62$a$ is connected to the P1$r$P2$c$ member 54. Another end of the first connection part 62$a$ is connected to the fourth clutch C4 from an inner periphery side. An end of the second connection part 62$b$ is connected to the fourth clutch C4 from an outer periphery side of the fourth clutch C4. Another end of the second connection part 62$b$ is connected to the carrier P3$c$ of the third planetary gear mechanism P3.

The ring gear P3$r$ of the third planetary gear mechanism P3 is connected to the second brake B2 via a P3$r$B2 member 71 serving as a connection member. The carrier P3$c$ of the third planetary gear mechanism P3 is always connected to the output shaft T by means of a P3$c$T member 72 serving as a connection member.

According to the transmission 30 structured as described above, the control ECU 2 controls the actuation state of six engaging elements including the first to fourth clutches C1 to C4 and the first and second brakes B1, B2. The transmission 30 establishes ten forward speeds and one reverse speed by selectively actuating three engaging elements out of six engaging elements, for example. Accordingly, the automatic transmission 1 changes the speed of the rotation drive force inputted via the torque converter 10 by a speed stage established by the transmission 30 and outputs the rotation drive force with the changed speed from the output shaft T.

Constructions of a power take off (PTO) mechanism and the first brake B1 will be explained as follows. The PTO mechanism is configured to output the rotation drive force to the outside of the transmission 30, or an external device. The rotation drive force outputted to the outside of the transmission 30 is transmitted to, for example, an accessory for the vehicle positioned at the outer periphery side of the housing H, for example, as an auxiliary power. The PTO mechanism includes an external output gear 91 and a driven gear. The external output gear 91 is disposed between the friction members 81 of the first brake B1 and the actuator portion 83 in the direction of rotation axis L, as illustrated in FIGS. 1 and 2. The external output gear 91 is provided at the cylindrical portion 56$a$ of the P1$c$N member 56 integrally rotating with the input shaft N. More particularly, the external output gear 91 is fixed to an outer circumferential surface of the cylinder portion that extends in the direction of the rotation axis L to be integral at the cylindrical portion 56$a$.

According to the transmission 30 having connection states shown in FIG. 1, the first brake B1 brakes the rotation of the sun gear P1$s$ of the first planetary gear mechanism P1. The friction members 81, the piston member 82, and the actuator portion 83 of the first brake B1 are arranged as described below. The friction members 81 of the first brake B1 is positioned at the output side relative to the first planetary gear mechanism P1 (i.e., the friction members 81 of the first brake B1 is positioned at the output side which is closer to the output shaft T relative to the first planetary gear mechanism P1). The actuator portion 83 of the first brake B1 is disposed at the input side relative to the first planetary gear mechanism P1.

The piston member 82 of the first brake B1 is disposed over the disposed position of the friction member 81 and the disposed position of the actuator portion 83 in the direction of the rotation axis L so as to connect the friction members 81 and the actuator portion 83. Thus, the piston member 82 is provided at an outer periphery side (radially outward) of the external output gear 91 disposed between the friction members 81 and the actuator portion 83 in the direction of the rotation axis L and extends in the direction of the rotation axis L. The piston member 82 includes a pressing portion 82$a$ which applies a pressure, a pressure receiving portion 82$b$, and an opening portion 82$c$. The pressing portion 82$a$ is a cylindrical member that pushes the friction members 81. The pressure receiving portion 82$b$ is a disc shaped member to which the pressing force is applied from the actuator portion 83. According to the embodiment, the pressure receiving portion 82$b$ is integrally formed with the actuator portion 83.

The pressing portion 82a of the piston member 82 is, as illustrated in FIG. 2, connected to the pressure receiving portion 82b at a radially outward of an addendum circle of the external output gear 91. More particularly, an end portion of the pressing portion 82a positioned at the input side is engaged with an engaging portion formed at an outer periphery side of the pressure receiving portion 82b to be connected to each other.

Figure 3:
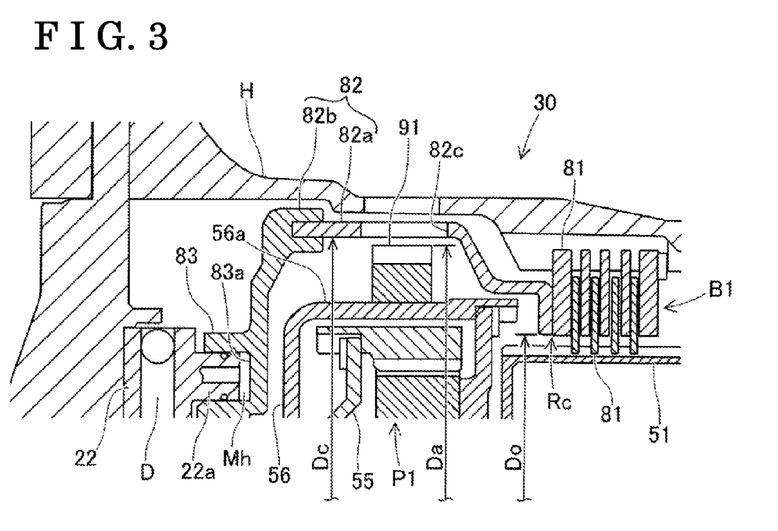
FIG. 3 is a cross-sectional view showing an enlarged view of a part of a piston member according to the embodiment disclosed here.

According to the construction of the embodiment, the actuator portion 83 is disposed radially inward relative to the addendum circle of the external output gear 91. Further, a part Rc which is pushed by the piston member 82 at the friction members 81 is positioned radially inward relative to the addendum circle of the external output gear 91. According to the above-explained construction, an opening diameter Do of an inner peripheral rim at a pressing side end portion of the piston member 82 is smaller than a diameter Da of the addendum circle of the external output gear 91 as illustrated in FIG. 3 (Da>Do). Thus, the external output gear 91 having the addendum circle with a diameter greater than the opening diameter Do is disposed inside the piston member 82.

In those circumstances, because the diameter Da of the addendum circle of the external output gear 91 is greater than the opening diameter Do (Da>Do), the external output gear 91 cannot pass through the inner periphery side of the pressing side end portion of the piston member 82. According to this construction, the piston member 82 includes two members, the pressing portion 82a and the pressure receiving portion 82b that are connected each other at a radially outward relative to the diameter Da of the addendum circle of the external output gear 91. More particularly, as illustrated in FIG. 3, a diameter Dc of a connection portion of the pressing portion 82a and the pressure receiving portion 82b is greater than the diameter Da of the addendum circle of the external output gear 91 (Dc>Da).

In an assembling process of the transmission 30, the piston member 82 is structured by connecting the pressing portion 82a and the pressure receiving portion 82b after disposing the members, for example, the external output gear 91, to be positioned at an inner periphery side (radially inward) of the piston member 82. Thus, the piston member 82 is structured with two members that are connected at radially outward relative to the addendum circle of the external output gear 91. Accordingly, the external output gear 91 having the addendum circle with a diameter greater than the opening diameter Do of the inner peripheral rim of the pressing side end portion of the piston member 82 can be positioned at an inner periphery side (radially inward) of the piston member 82.

The opening portion 82c of the piston member 82 is formed over a predetermined angular range about the rotation axis L in a range in the direction of the rotation axis L in which the external output gear 91 is disposed. According to the embodiment, as illustrated in FIG. 3, the opening portion 82c is formed at the pressing portion 82a. Thus, a portion of the external output gear 91 is exposed to the outer periphery side (radially outward) relative to the pressing portion 82a via the opening portion 82c. Further, the housing H is formed with an opening portion corresponding to the opening portion 82c of the piston member 82. According to the foregoing construction, the PTO mechanism of the automatic transmission 1 makes the driven gear engage with the external output gear 91 to output the rotation drive force to the outside of the automatic transmission 1.

Effects and advantages of the embodiment will be explained as follows. In the transmission 30, the friction member 81 of the first brake B1 is disposed at the output side relative to the external output gear 91, and the actuator portion 83 of the first brake B1 is disposed at the input side relative to the external output gear 91. Accordingly, in case of positioning the external output gear 91 between the friction member 81 of the first brake B1 and the actuator portion 83 in the direction of the rotation axis L, the piston member 82 of the first brake B1 is disposed at an outer periphery side (radially outward) of the external output gear 91.

That is, the external output gear 91 that outputs the rotation drive force to the outer periphery side (radially outward) of the housing H is covered with the piston member 82 of the first brake B1. The piston member 82 of the transmission 30 is formed with the opening portion 82c over a predetermined angular range about the rotation axis L and in a range in the direction of the rotation axis L in which the external output gear 91 is disposed. Thus, because a portion of the external output gear 91 can be exposed via the opening portion 82c of the piston member 82, the external output gear 91 is engageable with the driven gear of the PTO mechanism. Accordingly, the positioning of the friction members 81, the piston member 82, and the actuator portion 83 of the first brake B1 is not limited by the positioning of the external output gear 91. Thus, according to the construction of the transmission 30, freedom for design of layouts can be enhanced while allowing the rotation drive force to be outputted to the outside.

Further, the external output gear 91 is provided at an outer circumferential surface of the cylindrical portion 56a at the P1cN member 56 that integrally rotates with the input shaft N. According to this construction, the transmission 30 can transmit the inputted rotation drive force to the outer periphery side (radially outward) relative to the ring gear P1r via the P1cN member 56 serving as the connection member. Thus, the transmission 30 does not need to be provided with a member exclusively for the external output, and the number of parts of the PTO mechanism can be reduced.

The pressing portion 82a and the pressure receiving portion 82b of the piston member 82 of the first brake B1 are connected to one another at a radially outward relative to the addendum circle of the external output gear 91. That is, the diameter Dc of the connection portion of the pressing portion 82a and the pressure receiving portion 82b is greater than the diameter Da of the addendum circle of the external output gear 91 (Dc>Da). Thus, in the assembling process of the transmission 30, the piston member 82 can be formed after disposing the external output gear 91. Accordingly, even with layouts in which the external output gear 91 having the addendum with the diameter Da greater than the opening diameter Do of the inner peripheral rim of the pressing portion 82a is disposed within the piston member 82 (Da>Do), the transmission 30 can be assembled by connecting the pressing portion 82a and the pressure receiving portion 82b after disposing the external output gear 91.

In a case where the actuator portion 83 of the first brake B1 is disposed radially inward relative to the addendum circle of the external output gear 91 and the piston member 82 is formed with an integral single member, considering the assembling of the transmission 30, the part Rc configured to be pushed by the piston member 82 at the friction members 81 is positioned radially outward relative to the addendum circle of the external output gear 91. On the other hand, according to the structure in which the piston member 82 is formed with two members, the pressing portion 82a and the pressure receiving portion 82b, compared to the construction in which the piston member 82 is formed with an integral single member, the friction members 81 of the first brake B1 is positioned further radially inward (further inner periphery side). Thus, radial dimension of the housing H to which the friction members 81 are provided can be reduced and thus the transmission 30 can be reduced in size.

Further, the oil pump 20 which supplies the oil pressure to the first brake B1 is positioned at the input side relative to the first planetary gear mechanism P1. Thus, both of the actuator portion 83 and the oil pump 20 are positioned at the input side relative to the first planetary gear mechanism P1. Thus, a distance between the part at which the oil pressure is generated at the oil pump 20 and a part to which the oil pressure is supplied at the actuator portion 83 can be shortened. Accordingly, the number of parts necessary for constructing the oil passage at the transmission 30 can be reduced.

Further, the oil pressure chamber Mh is formed between the actuator portion 83 and the pump body 22 of the oil pump 20. According to the foregoing construction, a distance from the part where the oil pressure is generated at the oil pump 20 to the oil pressure chamber Mh can be further shortened. Further, because a drive mechanism (actuator) that actuates the first brake B1 can be integrally formed by the pump body 22 and the actuator portion 83, the number of parts of the transmission 30 can be reduced.

Further, the actuator portion 83 restricts the rotation of the piston member 82 by the engagement of the peripheral end portions of each of portions (projection portion 22a, recessed portion 83a) that structures the oil pressure chamber Mh about the rotation axis L (i.e., circumferential end portions of projection portion 22a and the recessed portion 83a are engaged with each other). Accordingly, the rotation of the piston member 82 is restricted by the engagement of the pump body 22 and the actuator portion 83. Thus, because there is no need to provide an exclusive member for stopping the rotation of the piston member 82, the construction of the transmission 30 is simplified.

Modified examples of the embodiment disclosed here will be explained hereinafter. One example of layouts of the transmission 30 is explained in the embodiment. As long as the external output gear 91 is disposed between the friction members 81 of the first brake B1 and the actuator portion 83 in an axial direction, the transmission of the disclosure is applicable. Further, the first brake B1 may brake one of the sun gear P1s, the ring gear P1r, and the carrier P1c of the first planetary gear mechanism P1 (the first brake B1 may define one of the sun gear P1s, the ring gear P1r, and the carrier P1c of the first planetary gear mechanism P1 as a target of the braking). For example, the transmission may adopt layouts described as follows. The same reference numerals are provided to the structures common to the embodiment.

Figure 4:
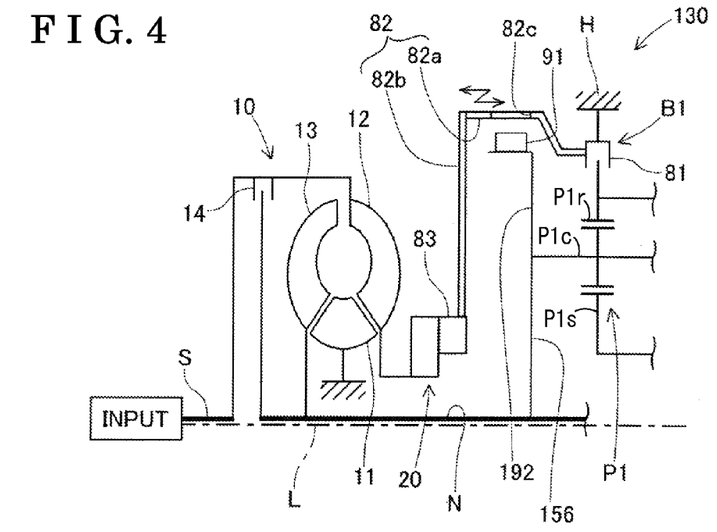
FIG. 4 is a schematic view of a transmission according to a first modified example of the embodiment disclosed here.

According to a transmission 130 according to a first modified example of the embodiment, elements are connected as illustrated in FIG. 4. More particularly, the first brake B1 brakes the rotation of the ring gear P1r of the first planetary gear mechanism P1. The carrier P1c of the first planetary gear mechanism P1 is connected to the input shaft N by the P1cN member 156 serving as a connection member.

One end of the P1cN member 156 is connected to an outer periphery of the input shaft N. Another end of the P1cN member 156 is connected to the carrier P1c of the first planetary gear mechanism P1 from the input side. The external output gear 91 is provided at a part of the P1cN member 156 that integrally rotates with the input shaft N. Particularly, the external output gear 91 is provided on an outer peripheral surface of an extension portion 192 of the P1cN member 156. The extension portion 192 is formed integrally with the P1cN member 156 to transmit the rotation drive force to an outer periphery side (radially outward) relative to the carrier P1c.

According to the layout of the transmission 130, the external output gear 91 is disposed between the friction member 81 of the first brake B1 and the actuator portion 83 in the direction of the rotation axis L. That is, the piston member 82 of the first brake B1 is disposed at the outer periphery side (radially outward) relative to the external output gear 91. The opening portion 82c is formed on the piston member 82 in the layout of the transmission 130.

Similarly to the transmission 30 of the embodiment, according to the transmission 130 of the first modified example, a driven gear is engageable with the external output gear 91 that exposes via the opening portion 82c. Thus, in the layout in which the actuator portion 83 of the first brake B1 is positioned at the input side relative to the external output gear 91, freedom for design in the layout can be enhanced while allowing the rotation drive force to be outputted to the outside, or an external device.

Figure 5:
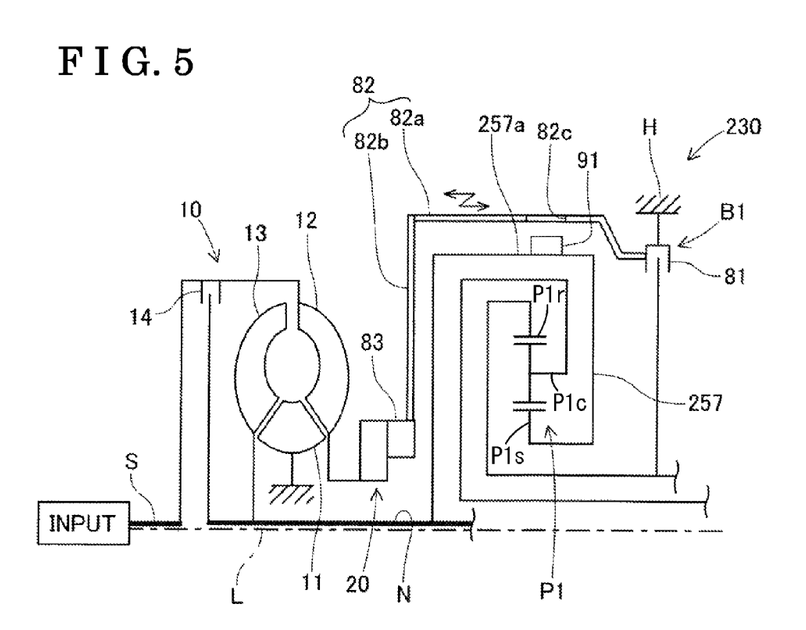
FIG. 5 is a schematic view of a transmission according to a second modified example of the embodiment disclosed here.

According to a transmission 230 according to a second modified example of the embodiment, elements are connected as illustrated in FIG. 5. More particularly, the first brake B1 brakes the rotation of the ring gear P1r of the first planetary gear mechanism P1. The sun gear P1s of the first planetary gear mechanism P1 is always connected to the input shaft N via a P1sN member 257 serving as a connection member.

The P1sN member 257 includes a cylindrical portion 257a disposed at the outer periphery side of the ring gear P1r of the first planetary gear mechanism P1. The construction of the cylindrical portion 257a of the P1sN member 257 is substantially the same to the construction of the cylindrical portion 56a of the P1cN member 56 of the embodiment, thus the explanations will not be repeated. The external output gear 91 is provided at an outer periphery surface (outer circumferential surface) of the cylindrical portion 257a of the P1sN member 257.

According to the layout of the transmission 230, the external output gear 91 is disposed between the friction members 81 of the first brake B1 and the actuator portion 83 in the direction of the rotation axis L. That is, the piston member 82 of the first brake B1 is disposed at the outer periphery side (radially outward) relative to the external output gear 91. The opening portion 82c is formed on the piston member 82 in the layout of the transmission 230. Thus, the transmission 230 attains effects and advantages similar to those of the transmission 30 of the embodiment.

Further, according to the second modified example of the embodiment, the first brake B1 brakes the rotation of the ring gear P1r of the first planetary gear mechanism P1 as the target of the braking. The transmission of the disclosure is applicable to the layout in which the first brake B1 brakes the rotation of the carrier P1c of the first planetary gear mechanism P1.

Figure 6:
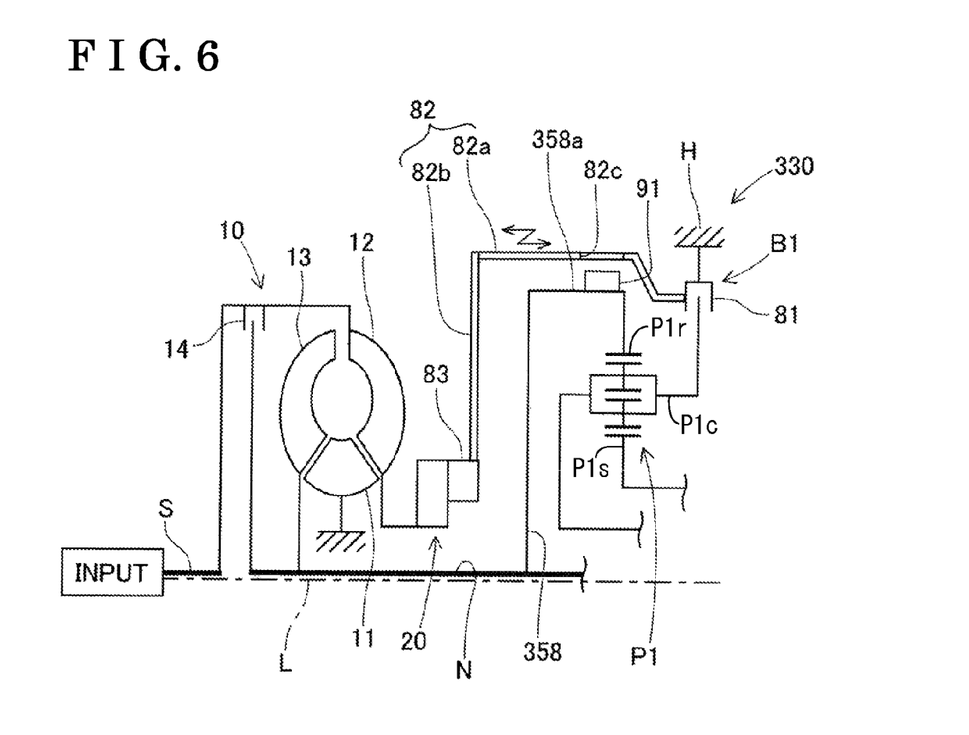
FIG. 6 is a schematic view of a transmission according to a third modified example of the embodiment disclosed here.

According to a transmission 330 of a third modified example of the embodiment, elements are connected as illustrated in FIG. 6. More particularly, the first brake B1 brakes the rotation of the carrier P1c of the first planetary gear mechanism P1. A double pinion type planetary gear mechanism is applied as the first planetary gear mechanism P1. In the double pinion type planetary gear mechanism, one of two pinion gears that are engaged each other is meshed with the sun gear P1s, and the other of two pinion gears is meshed with the ring gear P1r.

The ring gear P1r of the first planetary gear mechanism P1 is always connected to the input shaft N by a P1rN member 358 serving as a connection member. The P1rN member 358 includes a cylindrical portion 358a disposed at the outer periphery side (radially outward) relative to the ring gear P1r of the first planetary gear mechanism P1. The construction of the cylindrical portion 358a of the P1rN member 358 is substantially the same to the cylindrical portion 56a of the P1cN member 56 of the embodiment, and thus the explanations will not be repeated. The external output gear 91 is provided at the outer periphery surface of the cylindrical portion 358a of the P1rN member 358.

According to the layout of the transmission 330, the external output gear 91 is disposed between the friction members 81 of the first brake B1 and the actuator portion 83 in the direction of rotation axis L. That is, the piston member 82 of the first brake B1 is disposed at the outer periphery side (radially outward) relative to the external output gear 91. The opening portion 82c is formed on the piston member 82 in the layout of the transmission 330. Thus, the transmission 330 can attain effects and advantages similar to those of the transmission 30 of the embodiment.

According to the second modified example, the first brake B1 brakes the rotation of the ring gear P1r of the first planetary gear mechanism P1 as a target of the braking. On the other hand, alternatively, the transmission of the disclosure is applicable in the layout in which the first brake B1 brakes the rotation of the carrier P1c of the first planetary gear mechanism P1.

The opening portion 82c of the piston member 82 of the embodiment is formed over the predetermined angular range about the rotation axis L within an axial range in which the external output gear 91 is positioned. A configuration of the opening portion 82c is determined in accordance with a circumferential position of a portion for outputting the rotation drive force from the transmission 30 and/or in accordance with a configuration of the driven gear. Further, alternatively, plural opening portions 82c may be formed on the piston member 82 and the external output gear 91 may be simultaneously engaged with plural driven gears.

According to the embodiment, the piston member 82 includes the pressing portion 82a and the pressure receiving portion 82b. Alternatively, in a case where a diameter of an imaginary circle that passes through the part Rc pushed by the piston member 82 at the friction member 81 of the first brake B1 is greater than an outer diameter of the external output gear 91, the piston member 82 may be formed in an integral single member. In those circumstances, the number of parts of the transmission 30 is reduced.

According to the construction of the embodiment, a transmission (30, 130, 230, 330) includes a housing (H), a planetary gear mechanism (P1) supported by the housing (H) to be rotatable about a rotation axis (L), an input shaft (N) supported by the housing (H) to be rotatable about the rotation axis (L), the input shaft (N) being inputted with a rotation drive force, an output shaft (T) supported by the housing (H) to be rotatable about the rotation axis (L), the output shaft (T) outputting the rotation drive force with speed changed by the planetary gear mechanism (P1), a brake (B1) including a friction member (81), a piston member (82) pressing the friction member (81), and an actuator portion (83) applying a pressing force to the piston member (82), the brake (B1) braking a rotation of one of a sun gear (P1s), a ring gear (P1r), and a carrier (P1c) of the planetary gear mechanism (P1), an external output gear (91) positioned between the friction member (81) and the actuator portion (83) in a direction of the rotation axis (L), the external output gear (91) provided at a member integrally rotating with the input shaft (N), the external output gear (91) for outputting the rotation drive force to an outer periphery side relative to the housing (H), and the piston member (82) including an opening portion (82c) formed over a predetermined angular range about the rotation axis (L) and within a range in the direction of the rotation axis (L) in which the external output gear (91) is disposed.

According to the construction of the embodiment (disclosure), the external output gear (91) is positioned at an inner periphery side of the piston member (82) connecting the friction member (81) of the brake (B1) and the actuator portion (83). However, the external output gear (91) is engageable with a driven gear of a mechanism (PTO mechanism) outputting a rotation drive force at an exposed part of the piston member (82) via the opening portion (82c). Disposed positions of components of the brake (B1) are set without the limitation by the positioning of the external output gear (91). Thus, the transmission (30, 130, 230, 330) can output the rotation drive force to the outside, or an external device, and the freedom for design of layouts is enhanced.

According to the embodiment, the transmission further includes a connection member (56) connecting the input shaft (N) and the carrier (P1c) of the planetary gear mechanism (P1). The brake (B1) brakes a rotation of the sun gear (P1s) of the planetary gear mechanism (P1). The friction member (81) of the brake (B1) is positioned at an output side where the output shaft (T) is positioned relative to the external output gear (91). The connection member (56) includes a cylindrical portion (56a) positioned at an outer periphery side relative to the ring gear (P1r) of the planetary gear mechanism (P1), the cylindrical portion (56a) integrally rotating with the input shaft (N). The external output gear (91) is provided at an outer circumferential surface ( ) of the cylindrical portion (56a) at the connection member (56).

Thus, by providing the external output gear (91) to the cylindrical portion (56a) of the connection member (56), the external output gear (91) integrally rotates with the input shaft (N). Thus, because the transmission (30) does not require an exclusive member for the external output for transmitting the rotation drive force of the input to the outer periphery side relative to the ring gear (P1r), the number of the parts of the PTO mechanism can be reduced. Further, according to this construction, the friction member (81) of the brake (B1) is positioned at an output side relative to the external output gear (91). According to the construction of the disclosure, the external output gear (91) is engageable with a (the) driven gear of the PTO mechanism at the opening portion (82c) of the piston member (82). Thus, because the actuator portion (83) of the brake (B1) can be positioned at an input side relative to the external output gear (91), the freedom for design in layouts can be enhanced.

According to the embodiment, the transmission further includes a connection member (156) connected to the carrier (P1c) of the planetary gear mechanism (P1) from an input side where the input shaft (N) is positioned, the connection member (156) connecting the input shaft (N) and the carrier (P1c) of the planetary gear mechanism (P1). The brake (B1) brakes a rotation of the ring gear (P1r) of the planetary gear mechanism (P1). The external output gear (91) is provided at a part which integrally rotates with the input shaft (N) at the connection member (156).

According to this construction, the brake (B1) brakes the rotation of the ring gear (P1r) and the external output gear (91) is positioned at an input side relative to the friction member (81) of the brake (B1). According to the construction of the disclosure, the external output gear (91) is engageable with a driven gear of the PTO mechanism at the opening portion (82c) of the piston member (82). Thus, because actuator portion (83) of the brake (B1) can be positioned at an input side relative to the external output gear (91), the freedom for design in layouts can be enhanced.

According to the embodiment, the transmission further includes a connection member (257) connecting the input shaft (N) and the sun gear (P1s) of the planetary gear mechanism (P1). The brake (B1) brakes a rotation of the ring gear (P1r) or the carrier (P1c) of the planetary gear mechanism. The connection member (257) includes a cylindrical portion (257a) positioned at an outer periphery side relative to the ring gear (P1r) of the planetary gear mechanism (P1) and integrally rotating with the input shaft (N). The external output gear (91) is provided at an outer circumferential surface of the cylindrical portion (257a) at the connection member (257).

Thus, by providing the external output gear (91) at the cylindrical portion (257a) of the connection member (257), the external output gear (91) integrally rotates with the input shaft (N). Accordingly, because the transmission (230) does not require an exclusive member for the external output for transmitting a rotation drive force of the input to the outer periphery side of the ring gear (P1r), the number of parts of the PTO mechanism is reduced. Further, according to the construction of the disclosure, the friction member (81) of the brake (B1) is positioned at the output side relative to the external output gear (91). According to the disclosure, the external output gear (91) is engageable with a driven gear of the PTO mechanism at the opening portion (82c) of the piston member (82). Thus, because the actuator portion (83) of the brake (B1) can be positioned at the input side relative to the external output gear (91), the freedom for design in layouts can be enhanced.

According to the embodiment, the actuator portion (83) is positioned radially inward relative to an addendum circle of the external output gear (91). A part (Rc) that is pushed by the piston member (82) at the friction member (81) is positioned radially inward relative to the addendum circle of the external output gear (91). The piston member (82) includes a pressing portion (82a) for pushing the friction member (81) and a pressure receiving portion (82b) to which a pressure force is applied by the actuator portion (83). The pressing portion (82a) and the pressure receiving portion (82b) are connected one another at a radially outward relative to the addendum circle of the external output gear (91).

According to the brake having positional relationship of the components as described above, generally, the friction member can be positioned at an inner periphery side compared to a construction in which a piston member is structured with a single integral member. Thus, a radial dimension of the housing in which the friction member is provided can be reduced, and thus the transmission (30, 130, 230, 330) can be downsized. However, according to the piston member (82) of the brake (B1) having the positional relationship of the components described above, generally, the external output gear is disposed within the piston member of the brake. Thus, the assembling of the transmission is not easy. On the other hand, according to the piston member (82) of the disclosure, the pressing portion (82a) and the pressure receiving portion (82b) are connected one another at a radially outward relative to the addendum circle of the external output gear (91). Accordingly, in the assembling process of the transmission, the piston member (82) is structured by connecting the pressure receiving portion (82b) and the pressing portion (82a) after disposing the external output gear (91) at an inner periphery side relative to the piston member (82). Thus, compared to a case where the piston member (82) is structured with a single integral member, the assembling performance of the transmission can be enhanced.

According to the embodiment, the brake (B1) corresponds to an oil pressure type brake that is actuated by an oil pressure supplied from an oil pump (20). The oil pump (20) is positioned at an input side where the input shaft (N) is positioned relative to the planetary gear mechanism (P1).

Because the brake (B1) applied to the transmission (30, 130, 230, 330) is fixed to an inner periphery of the housing (H), in a case where an oil pressure type brake is applied as the brake, the oil pressure is supplied to the actuator portion via oil passage formed at the housing, for example. Thus, in a case where an oil pump (20) is disposed at an input side relative to the planetary gear mechanism (P1), a distance from the oil pump (20) to the actuator portion (83) is assumed to be long. Further, according to the construction where the oil pressure is supplied via plural members, the structure is assumed to be complex because, for example, a sealing member is required. On the other hand, according to the construction of the disclosure, because the actuator portion (83) is positioned at the input side relative to the planetary gear mechanism (P1) similarly to the oil pump (20), a distance from a part where the oil pressure is generated at the oil pump (20) to a part to which the oil pressure is supplied at the actuator portion (83) can be shortened. Further, the number of parts necessary for constructing the oil passage at the transmission can be reduced.

According to the embodiment, the actuator portion (83) forms an oil pressure chamber (Mh) between the actuator portion (83) and a pump body (22) of the oil pump (20), and circumferential end portions of parts (22a, 83a) that structure the oil pressure chamber (Mh) engage with each other about the rotation axis (L) to restrict a rotation of the piston member (82).

According to the construction of the disclosure, because the oil pressure chamber (Mh) is formed between the pump body (22) of the oil pump (20) that supplies the oil pressure and the actuator portion (83), a distance from a part where the oil pressure is generated to the oil pressure chamber (Mh) can be further shortened. Further, because a drive mechanism (actuator) for actuating the brake (B1) can be integrally formed by the pump body (22) and the actuator portion (83), the number of parts of the transmission (30, 130, 230, 330) can be reduced. Still further, the rotation of the piston member (82) is restricted by the engagement of the circumferential end portions of the parts that structure the oil pressure chamber (Mh) about the rotation axis (L). Accordingly, because there is no need to provide an exclusive member for stopping the rotation of the piston member (82), the construction of the transmission (30, 130, 230, 330) is simplified.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:
1. A transmission, comprising:
a housing;
a planetary gear mechanism supported by the housing to be rotatable about a rotation axis;
an input shaft supported by the housing to be rotatable about the rotation axis, the input shaft being inputted with a rotation drive force;

an output shaft supported by the housing to be rotatable about the rotation axis, the output shaft outputting the rotation drive force with speed changed by the planetary gear mechanism;

a brake including a friction member, a piston member pressing the friction member, and an actuator portion applying a pressing force to the piston member, the brake braking a rotation of one of a sun gear, a ring gear, and a carrier of the planetary gear mechanism;

an external output gear positioned between the friction member and the actuator portion in a direction of the rotation axis, the external output gear provided at a member integrally rotating with the input shaft, the external output gear for outputting the rotation drive force to an outer periphery side relative to the housing; and the piston member including an opening portion formed over a predetermined angular range about the rotation axis and within a range in the direction of the rotation axis in which the external output gear is disposed.

2. The transmission according to claim 1 further comprising:

a connection member connecting the input shaft and the carrier of the planetary gear mechanism; wherein the brake brakes a rotation of the sun gear of the planetary gear mechanism;

the friction member of the brake is positioned at an output side where the output shaft is positioned relative to the external output gear;

the connection member includes a cylindrical portion positioned at an outer periphery side relative to the ring gear of the planetary gear mechanism, the cylindrical portion integrally rotating with the input shaft; and the external output gear is provided at an outer circumferential surface of the cylindrical portion at the connection member.

3. The transmission according to claim 1 further comprising:

a connection member connected to the carrier of the planetary gear mechanism from an input side where the input shaft is positioned, the connection member connecting the input shaft and the carrier of the planetary gear mechanism; wherein the brake brakes a rotation of the ring gear of the planetary gear mechanism; and the external output gear is provided at a part which integrally rotates with the input shaft at the connection member.

4. The transmission according to claim 1 further comprising:

a connection member connecting the input shaft and the sun gear of the planetary gear mechanism; wherein the brake brakes a rotation of the ring gear or the carrier of the planetary gear mechanism;

the connection member includes a cylindrical portion positioned at an outer periphery side relative to the ring gear of the planetary gear mechanism and integrally rotating with the input shaft; and the external output gear is provided at an outer circumferential surface of the cylindrical portion at the connection member.

5. The transmission according to claim 1, wherein the actuator portion is positioned radially inward relative to an addendum circle of the external output gear;

a part that is pushed by the piston member at the friction member is positioned radially inward relative to the addendum circle of the external output gear;

the piston member includes a pressing portion for pushing the friction member and a pressure receiving portion to which a pressure force is applied by the actuator portion; and the pressing portion and the pressure receiving portion are connected one another at a radially outward relative to the addendum circle of the external output gear.

6. The transmission according to claim 1, wherein the brake corresponds to an oil pressure type brake that is actuated by an oil pressure supplied from an oil pump; and the oil pump is positioned at an input side where the input shaft is positioned relative to the planetary gear mechanism.

7. The transmission according to claim 6, wherein the actuator portion forms an oil pressure chamber between the actuator portion and a pump body of the oil pump, and circumferential end portions of parts that structure the oil pressure chamber engage with each other about the rotation axis to restrict a rotation of the piston member.

* * * * *